(12) United States Patent
Kurumada et al.

(10) Patent No.: US 7,082,251 B2
(45) Date of Patent: Jul. 25, 2006

(54) OPTICAL DEVICE

(75) Inventors: Katsuhiko Kurumada, Tokyo (JP);
Toshiaki Tamamura, Tokyo (JP);
Masatoshi Kanaya, Tokyo (JP);
Makoto Satoh, Tokyo (JP); Yoshihiko Suzuki, Funabashi (JP)

(73) Assignees: NTT Electronics Corporation, Tokyo (JP); NIKON Corporation, Tokyo (JP)

( * ) Notice: Subject to any disclaimer, the term of this patent is extended or adjusted under 35 U.S.C. 154(b) by 0 days.

(21) Appl. No.: 10/509,018

(22) PCT Filed: Mar. 27, 2003

(86) PCT No.: PCT/JP03/03877

§ 371 (c)(1),
(2), (4) Date: Sep. 27, 2004

(87) PCT Pub. No.: WO03/083550

PCT Pub. Date: Oct. 9, 2003

(65) Prior Publication Data

US 2005/0163428 A1 Jul. 28, 2005

(30) Foreign Application Priority Data

Mar. 28, 2002 (JP) ............................. 2002-091405
Mar. 24, 2003 (JP) ............................. 2003-081362

(51) Int. Cl.
*G02B 6/00* (2006.01)
(52) U.S. Cl. ........................................ 385/140; 385/39
(58) Field of Classification Search .................. 385/16, 385/19, 39, 140
See application file for complete search history.

(56) References Cited

U.S. PATENT DOCUMENTS

| 5,016,978 | A | * | 5/1991 | Fargette et al. ............. 359/234 |
| 6,360,036 | B1 | * | 3/2002 | Couillard ...................... 385/19 |
| 6,493,482 | B1 | * | 12/2002 | Al-hemyari et al. .......... 385/19 |
| 6,628,452 | B1 | * | 9/2003 | Haeberle et al. ............. 359/298 |
| 6,633,212 | B1 | * | 10/2003 | Ruan et al. ................. 335/78 |
| 6,936,950 | B1 | | 8/2005 | Akagawa et al. |
| 2001/0017957 | A1 | * | 8/2001 | Horino et al. ................. 385/16 |

FOREIGN PATENT DOCUMENTS

| CN | 1324453 A | 11/2001 |
| JP | 2-131210 | 5/1990 |
| JP | 05-257069 | 10/1993 |
| JP | 11-119123 | 4/1999 |
| JP | 2003-35875 | 2/2003 |
| WO | WO 00/25160 | 5/2000 |

* cited by examiner

*Primary Examiner*—Ellen E. Kim
(74) *Attorney, Agent, or Firm*—Venable LLP; Michael A. Sartori; Thomas C. Schoeffler (57) ABSTRACT

An optical device is configured such that an insertion plate is held by a flat cantilever having electric wiring, and the flat magnet is placed in such a manner that the magnet faces a surface of the cantilever opposite to the other surface of the cantilever facing an optical waveguide, and that the current flowing through the electric wiring is controlled in this state so that the Lorentz force caused by the interaction between the current and the magnetic field displaces the cantilever to drive the insertion plate, and to insert or remove the insertion plate into or out of the slit provided in the optical waveguide to switch the optical path of signal light or to adjust the quantity of an optical beam.

3 Claims, 10 Drawing Sheets

OPTICAL DEVICE

TECHNICAL FIELD

The present invention relates to an optical device, and more particularly to an optical device such as an optical waveguide matrix switch and a variable attenuator operated by driving a reflecting mirror plate or an optical beam screen plate by the action of a magnet.

BACKGROUND ART

Conventionally, an optical switch is known that interrupts or transmits an optical beam from an optical waveguide by moving a screen plate placed halfway through the optical waveguide as a configuration of an optical switch. Japanese patent application laid-open Nos. 05-257069(1993) and 02-131210 (1990) disclose concrete configurations of such an optical switch. In the following description, the optical switch with a configuration disclosed in Japanese patent application laid-open No. 05-257069 (1993) is referred to as a conventional technique A, and the optical switch with a configuration disclosed in Japanese patent application laid-open No. 02-131210 (1990) is referred to as a conventional technique B to explain the conventional techniques.

Figure 9:
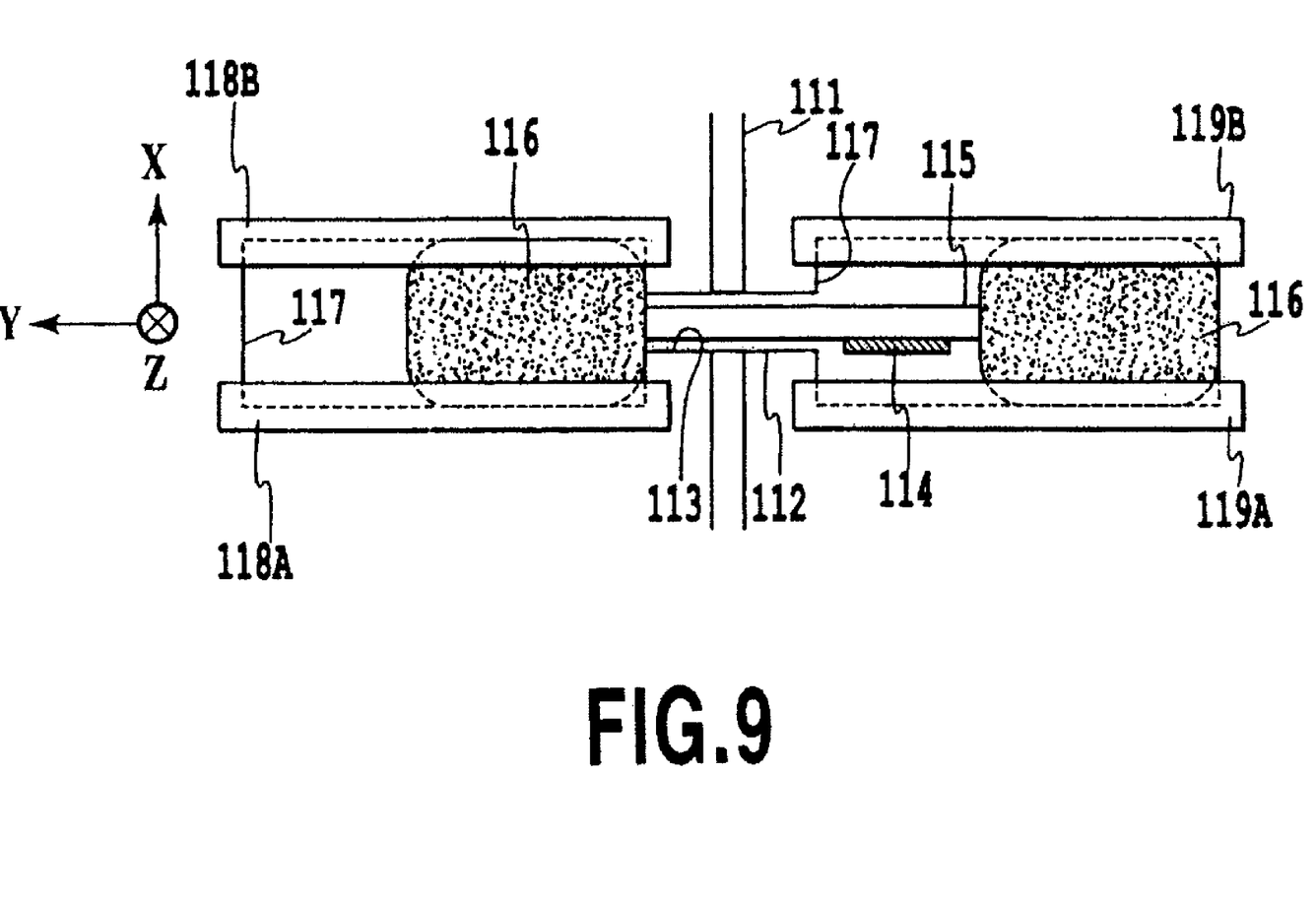
FIG. 9 is a plan view illustrating a configuration of an optical switch disclosed as the conventional technique A.

FIG. 9 is a plan view illustrating a configuration of the optical switch disclosed as the conventional technique A. The optical switch includes a glass piece 115 movable along a groove provided in an interior 113 of a groove section 112 crossing an optical waveguide 111 formed on a substrate; a liquid metal holding groove 117 placed at both ends of the glass piece 115 and communicating to the groove section 112, for holding a liquid metal (mercury) 116 in the interior; electrodes 118A, 118B and 119A, 119B for flowing current through each of the liquid metals 116 held in the interior of the liquid metal holding groove 117; and a magnetic field applying section (not shown) for applying a magnetic field in a direction perpendicular to the current direction.

Then the glass piece is moved in such a manner that a metal mirror 114 mounted on a part of the glass piece interrupts the optical waveguide 111 by applying a magnetic field in a direction (Z direction) perpendicular to a direction (X direction), in which a current flows when the current is supplied across the liquid metal 116, so that the liquid metal 116 experiences the Lorentz force and is moved in the Y direction through the liquid holding groove. In contrast, an input light passing through the optical waveguide 111 is transmitted by removing the metal mirror 114 from the optical waveguide 111 by reversing the direction of the current. By thus controlling the direction of the current flowing through the liquid metal 116, the light propagating through the optical waveguide 111 is interrupted or transmitted, thereby implementing the optical switch. As for the optical switch with the configuration, magnets (not shown) are placed at the upper and lower sides of a substrate to generate the magnetic field in the direction (Z direction) perpendicular to the substrate.

Figure 10:
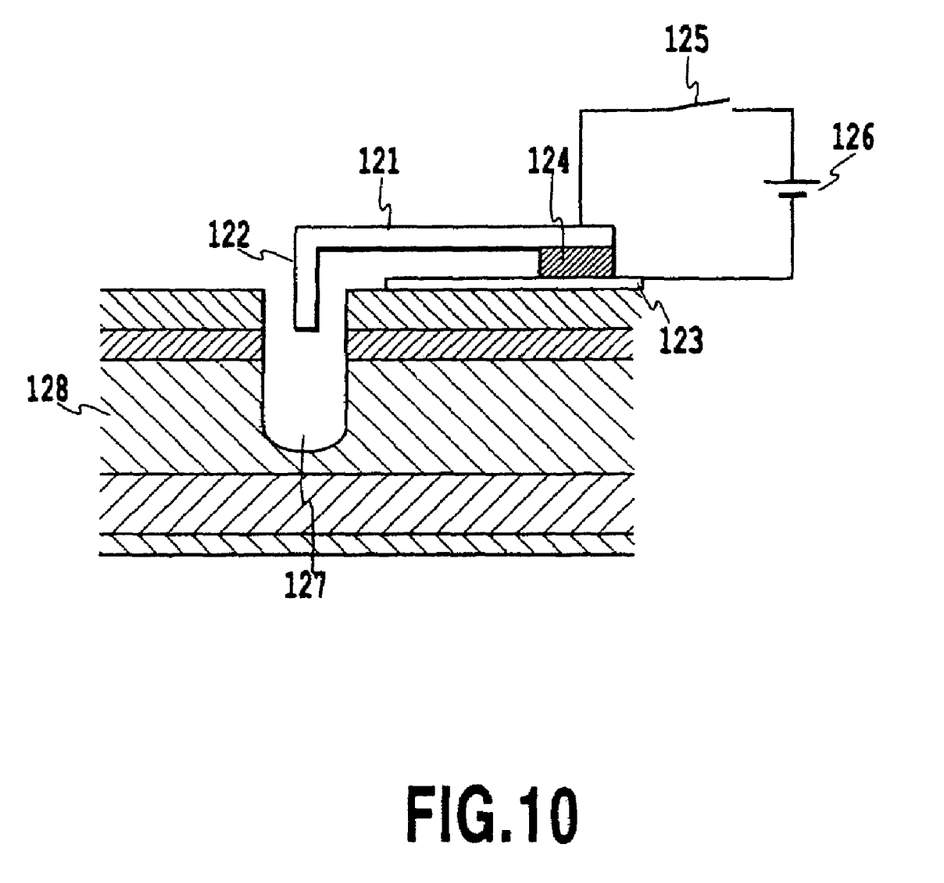
FIG. 10 is a schematic cross-sectional view showing a configuration of an optical switch disclosed as the conventional technique B.

FIG. 10 is a schematic cross-sectional view showing a configuration of an optical switch disclosed as the conventional technique B. In FIG. 10, the reference numeral 121 designates a displacement plate composed of a conductive material, 122 designates an element at the front end of the displacement plate 121 for interrupting/transmitting propagating light, 124 designates an insulating layer for supporting the rear end side of the displacement plate 121, 125 designates a switch, 126 designates a power supply, 128 designates an optical waveguide, 127 designates a gap across the optical waveguide 128, and 123 designates a conductive material layer mounted on a surface of the optical waveguide 128 in such a manner that the conductive material layer is parallel to the waveguide direction of the light.

In the optical switch with the configuration as shown in FIG. 10, the element 122 moves in a direction normal to the substrate (up and down direction of the sheet) because of the electrostatic force caused between the displacement plate 121 and the conductive material layer 123 by applying voltage, thereby carrying out the optical switch operation of interrupting/transmitting.

As for the optical switch configuration of the conventional technique A, it requires a space for placing in the optical waveguide the driving section composed of the liquid metal holding groove and electrodes for operating the moving section. Accordingly, upsizing of the optical switch including the driving section as its integral part is unavoidable. In particular, the space for the driving section has a problem of hampering the high-density integration of the optical switch elements, when the optical switch elements are placed in a matrix on the same substrate.

On the other hand, the optical switch configuration of the conventional technique B has the screen plate moved in the direction perpendicular to the substrate, and has the structure that accesses the optical waveguide from the upper side of the optical waveguide. Thus, it is not necessary for the optical switch to have a driving mechanism within the optical waveguide. In this respect, the optical switch can be considered to have the configuration suitable for high-density integration of the optical waveguide. However, since the configuration utilizes the electrostatic force as the driving force, it requires a high voltage for driving, and hence upsizes peripheral electronic circuits and devices, thereby limiting the downsizing of the optical switch as a whole.

Therefore a driving system that enables both the "Lorentz force driving" and "vertical movement of the moving section", which are the technical advantages of the foregoing configurations, will be able to implement the high-density integration of the optical waveguide and the downsizing of the device at the same time. A configuration of such an optical switch (optical device), however, has not yet been known.

DISCLOSURE OF THE INVENTION

The present invention is implemented to solve the foregoing problems. Therefore it is an object of the present invention to provide an optical device (optical switch) suitable for downsizing and high-density integration by enabling the screen plate for interrupting/transmitting light to move in the direction perpendicular to the substrate by the Lorentz force.

The object of the present invention is accomplished by an optical device having at least one slit at a desired location of a polygonal planar optical waveguide formed on a substrate, and carrying out optical path switching of signal light or control of quantity of light of an optical beam by moving an insertion plate up and down in the slit, the optical device comprising: flat insertion plate holding means for holding the insertion plate, the insertion plate holding means having electric wiring; and a flat magnet placed in a manner that the magnet faces a surface of the insertion plate holding means opposite to a surface facing the optical waveguide, wherein Lorentz force caused by interaction between current flowing through the electric wiring and magnetic field generated by the magnet displaces the insertion plate holding means to drive the insertion plate.

In the optical device, the magnet may have a size and shape that enable a projected image of the magnet onto the optical waveguide from a vertical direction to go in a face of the optical waveguide.

In the optical device, the magnet may be placed in a manner that extended directions of linear portions of edges obtained by projecting the magnet onto the optical waveguide from a vertical direction do not intersect at right angles with a direction of a magnetic field generated by the magnet.

BEST MODE FOR CARRYING OUT THE INVENTION

The best mode for carrying out the invention will now be described with reference to the accompanying drawings.

EMBODIMENT 1

Figure 1:
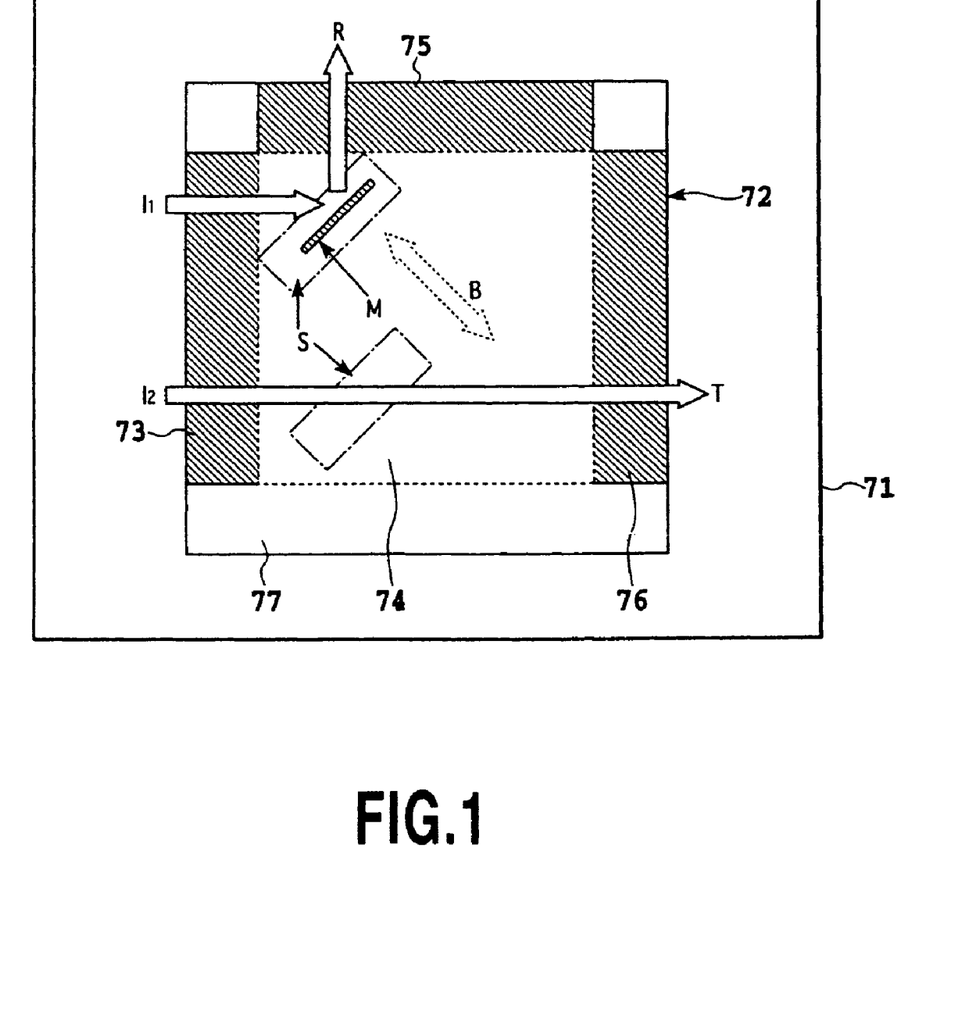
FIG. 1 is a plan view showing a first configuration of an optical waveguide formed in an optical device in accordance with the present invention.

FIG. 1 is a plan view showing a first configuration of an optical device in accordance with the present invention. An optical waveguide 72 embedded in the optical device is formed on a supporting substrate 71 of a square optical waveguide, consisting of five waveguide regions which are assigned different functions.

The region 1 (73) is an area including optical signal input side connecting end faces with a given number of optical fibers. The region 4 (76) is an area including optical fiber connecting end faces corresponding to an output side of optical signals which are input from the region 1 (73), pass through slit sections S and proceed straight forward. The region 3 (75) is an area including optical fiber connecting end faces corresponding to an output side of the optical signals which are input from the region 1 (73), and are reflected off the slit sections S. The region 5 (77) is an area without any optical fiber connecting end faces for outputting the optical waveguides.

The rectangular region 2 (74) surrounded by these regions has slit sections S. The slit sections S each have an insertion plate M inserted into or removed from the slit sections by driving by a magnetic field, thereby controlling the path of the signal lights. Accordingly, the magnetic field necessary for driving the insertion plate M must be applied to the region 2 (74).

FIG. 1 illustrates a typical state of the optical waveguide in the input optical waveguide region 1 (73) by way of example of optical beams $I_1$ and $I_2$ which are the input light. As for the optical beam $I_1$, since the insertion plate M is within the slit section S, the input beam $I_1$ is reflected off the insertion plate M, and is output as reflected light R belonging to the fiber connecting region 3 (75) on the reflection output side. As for the optical beam $I_2$, on the other hand, since the insertion plate M is not present in the slit section S, the optical beam $I_2$ passes through the slit sections S and proceeds straight forward, and the transmitted light T is output from the region 4 (76) constituting the output optical fiber connecting region.

When driving the insertion plate M by the magnetic field and current, the highest efficiency is achieved when a direction of the magnetic field B makes a right angle with a plane parallel to a cross section of the slit seen from the top as shown in FIG. 1 (or with a moving locus plane the insertion plate forms in the slit and its neighborhood). Accordingly, a magnet is placed in such a manner that the magnetic field B points the direction of the arrow B indicated by dotted lines in FIG. 1. Incidentally, the insertion plate M is fixed to a cantilever not shown, so that the insertion plate M is driven in conjunction with the cantilever. The drive is carried out by controlling the current flowing through electric wiring formed on the insertion plate M or the cantilever near the insertion plate M.

Figure 2:
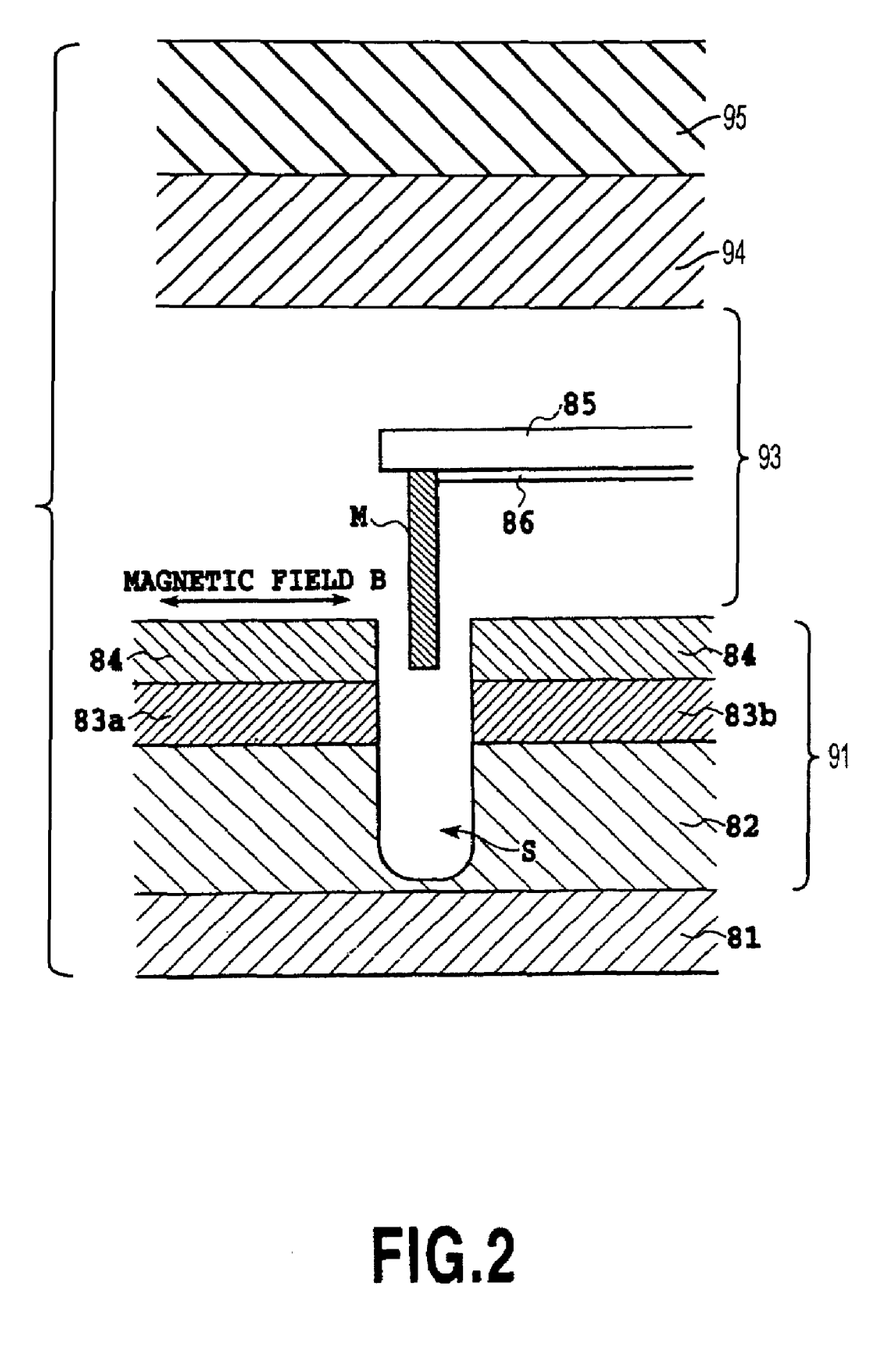
FIG. 2 is a schematic cross-sectional view illustrating relationships between an insertion plate and slit section provided in an optical waveguide embedded in an optical device in accordance with the present invention.

FIG. 2 is a schematic cross-sectional view illustrating relationships between an insertion plate and a slit section provided in an optical waveguide embedded in an optical device in accordance with the present invention. On a cladding layer 82 stacked on a substrate 81, an input fiber side optical waveguide core 83a and an output fiber side optical waveguide core 83b are formed. A slit section S is formed in a part of the optical waveguide formed by stacking a cladding layer 84 on these optical waveguide cores. An insertion plate M, which is fixed to a cantilever 85, is driven by a current flowing through electric wiring 86 which is formed at least on the cantilever 85 and has a specified length in the direction normal to the sheet, so that the insertion plate M is inserted into or removed from the slit section S.

A magnetic field applied to the insertion plate M has a component parallel to the sheet so that the magnetic field component acts on part of the electric wiring 86 having the component normal to the sheet. Thus, the current flowing through the electric wiring 86 gives the cantilever 85 the Lorentz force that drives it upward or downward in response to the direction of the current in accordance with Fleming's rule. The direction of the magnetic field that will maximize the Lorentz force acting on the cantilever 85 is the direction perpendicular to the moving direction of the insertion plate M.

An optical waveguide 91 is (82, 83a,83b, 84) formed on a supporting substrate 81 of the optical waveguides. On the optical waveguide 91, an MEMS supporting substrate 94 and a magnet 95 are mounted. The MEMS supporting substrate 94 has an MEMS holding region 93 for accommodating an insertion plate driving mechanism (MEMS: micro-electromechanical system).

Since the magnetic field B becomes sparse and weak as the field B goes away from the magnet 95, it is preferable that the MEMS holding region 93 in FIG. 2 be placed as closed to the magnet 95 as possible to drive the insertion plate by taking full advantage of the effect of the magnet.

As described above, the optical device of the present embodiment has the electric wiring, the flat insertion plate holding section for holding the insertion plate, and the flat magnet facing the surface of the insertion plate holding section opposite to the surface on the optical waveguide side, and is configured such that the optical device drives the insertion plate by displacing the insertion plate holding section by the Lorentz force based on the interaction between the current flowing through the electric wiring and the magnetic field generated by the magnet.

Figure 3:
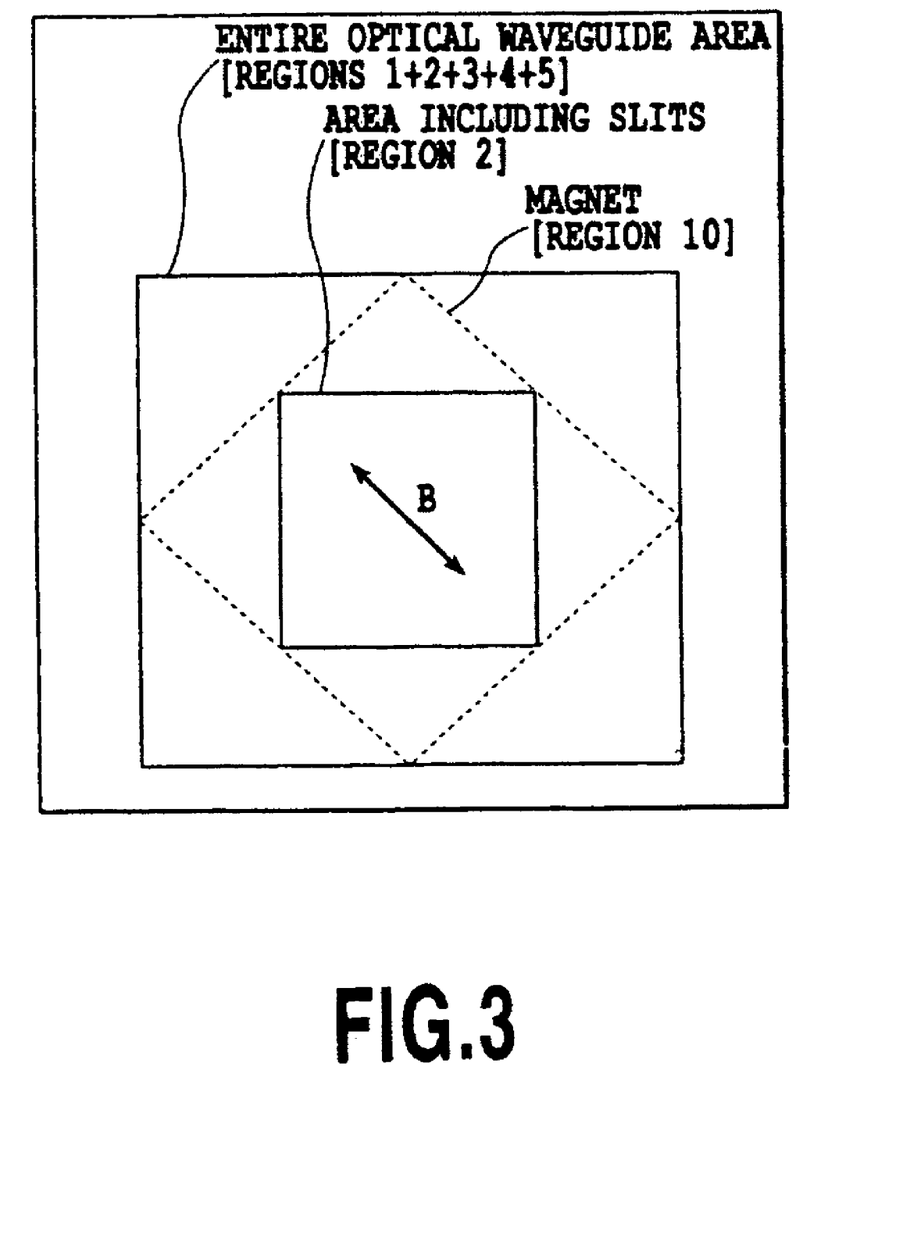
FIG. 3 is a diagram illustrating an optical waveguide with a configuration whose entire domain is expanded to the outside of the magnet.

Incidentally, FIG. 3 is a diagram illustrating an optical waveguide with a configuration whose entire domain is expanded to the outside of a magnet.

EMBODIMENT 2

The optical device of the foregoing embodiment 1 in accordance with the present invention has the driving system of the insertion plate that enables both the "Lorentz force driving" and the "vertical movement of the moving section". Thus, it has a great advantage of being able to implement the high-density integration of the optical waveguides and the downsizing of the device at the same time, which the conventional configuration does not possess. However, it has the following items of improvement.

First, referring to FIG. 2, the alignment of the optical waveguide 91 with the input side and output side fibers in the vertical direction is carried out by aligning the center of the fiber cores of the input side fiber and output side fiber of the optical signal to the end faces of the optical waveguide 91 at high accuracy, followed by fixing them mechanically. In this case, the radius of the fiber cladding layers, which cover the fiber cores of the fibers connected to the input and output end faces of the optical waveguide 91, is one hundred and a few tens of micrometers according to the current standard. The value is greater than a few tens of micrometers, the sum of the thickness of the core layer and that of the cladding layer constituting the optical waveguide 91. As a result, the top surface of the fiber cladding layer surpasses the top surface of the optical waveguide 91.

Therefore the distance between the bottom surface of the magnet 95 and the top surface of the optical waveguide 91, which is preferably as close as possible, is limited by the difference between the radius of the fiber cladding layer and the sum of the thicknesses of the core layer and cladding layer constituting the optical waveguide 91. This hinders placing the magnet 95 in close proximity to the optical waveguide 91 to make effective use of the magnetic force.

Second, to solve the problem, consider the case where the entire domain (regions 1+2+3+4+5) of the optical waveguides is extended outside the magnet region (region 10) as shown in FIG. 3. In this case, it is unavoidable that the optical waveguides occupy an area four times that of the region 2 for placing the slit having the fundamental function of the optical device, which prevents the downsizing of the optical waveguide chip.

In view of this, the present embodiment describes an optical device in accordance with the present invention that enables the effective use of the magnetic force and further downsizing of the optical waveguide chip.

Figure 4:
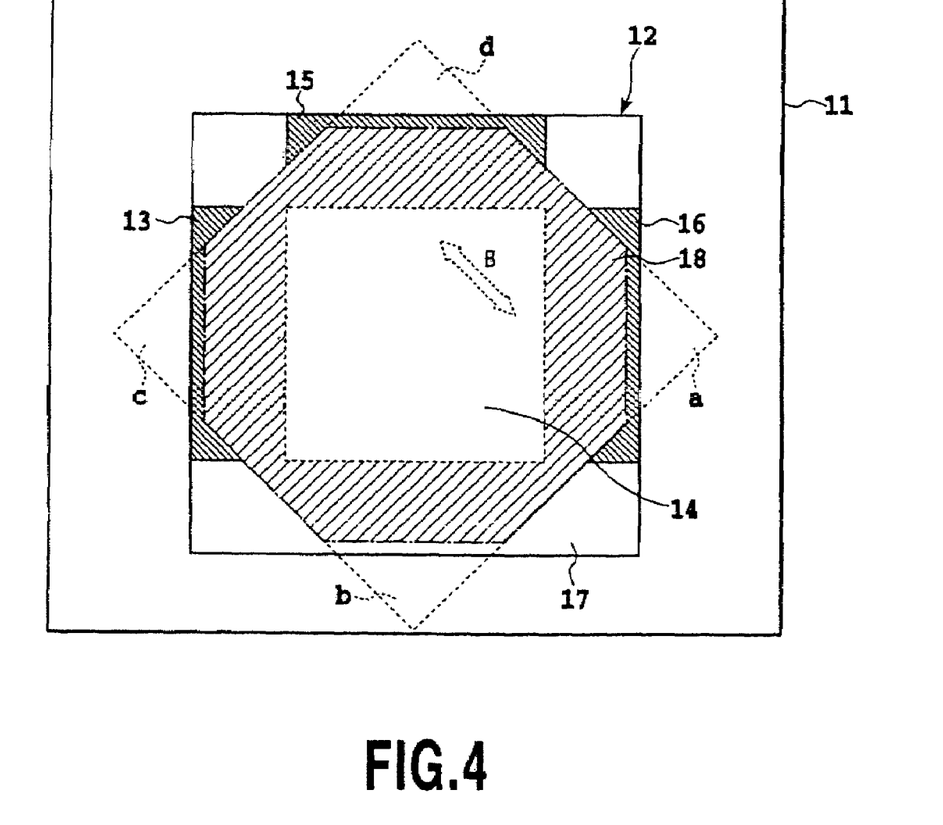
FIG. 4 is a plan view of an optical waveguide for illustrating a shape of a magnet embedded in an optical waveguide, the optical device in accordance with the present invention.

FIG. 4 is a plan view of an optical waveguide for illustrating a shape of a magnet embedded in an optical waveguide of an optical device in accordance with the present invention. The optical waveguide 12 is placed on a supporting substrate 11 that bears the square optical waveguide, and is composed of five waveguide regions having different functions.

The region 1 (13) is an area including optical signal input side connecting end faces with a given number of optical fibers. The region 4 (16) is an area including optical fiber connecting end faces corresponding to an output side of optical signals which are input from the region 1 (13) and proceed straight forward. The region 3 (15) is an area including optical fiber connecting end faces corresponding to an output side of the optical signals which are input from the region 1 (13), and are reflected off slit sections. The region 5 (17) is an area without any optical fiber connecting end faces for outputting the optical waveguides.

The rectangular region 2 (14) surrounded by these regions has a slit section. The slit section has an insertion plate inserted into or removed from the slit section by driving by a magnetic field, thereby controlling the path of the signal light. Accordingly, the region 2 (14) has a magnet 18 for generating the magnetic field necessary for driving the insertion plate.

The magnet 18 has an octagonal shape formed by cutting away four corners (a, b, c, and d) from a square, and has a size and shape, enabling a projected image of the magnet 18 onto the optical waveguide 12 from a vertical direction remains within an area of the optical waveguide 12. Thus, the magnetic field intensity in the entire region 2 (14) becomes uniform, and the total area of the optical waveguide 12 can be reduced as compared with that of the conventional optical waveguide.

Figure 5:
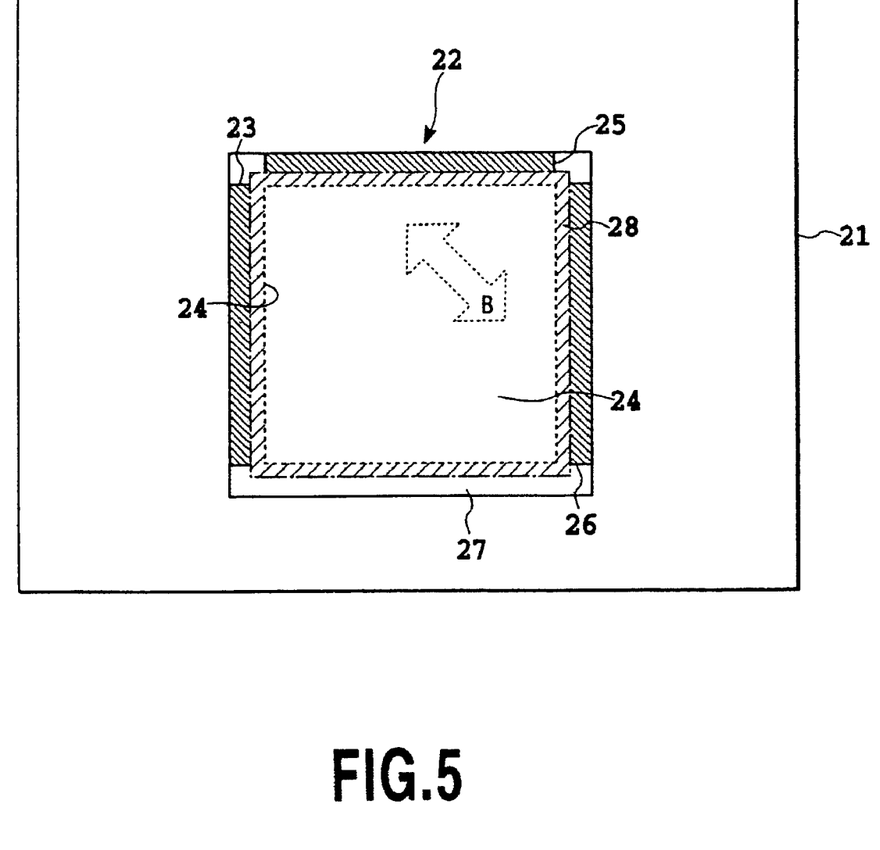
FIG. 5 is a plan view of an optical waveguide for illustrating another shape of a magnet embedded in an optical waveguide, an optical device in accordance with the present invention.

FIG. 5 is a plan view of an optical waveguide for illustrating another shape of the magnet embedded in an optical waveguide of an optical device in accordance with the present invention. An optical waveguide 22 is placed on a supporting substrate 21 that bears the square optical waveguide, and is composed of five waveguide regions having different functions.

The region 1 (23) is an area including optical signal input side connecting end faces with a given number of optical fibers. The region 4 (26) is an area including optical fiber connecting end faces corresponding to an output side of optical signals which are input from the region 1 (23) and proceed straight forward. The region 3 (25) is an area including optical fiber connecting end faces corresponding to an output side of the optical signals which are input from the region 1 (23), and are reflected off the slit sections. The region 5 (27) is an area without any optical fiber connecting end faces for outputting the optical waveguides.

The rectangular region 2 (24) surrounded by these regions has a slit section. The slit section has an insertion plate inserted into or removed from the slit section by driving by a magnetic field, thereby controlling the path of the signal light. Accordingly, the region 2 (24) has a magnet 28 for generating the magnetic field necessary for driving the insertion plate.

The magnet 28 is placed in such a manner that extended directions of linear portions of edges obtained by projecting the magnet onto the optical waveguide from a vertical direction do not intersect at right angles with the direction of the magnetic field generated by the magnet (direction perpendicular to the insertion plate in FIG. 7), and the magnet 28 has a shape of a minimum square that covers the region 2 (24). Thus, the magnetic field intensity in the entire region 2 (24) becomes uniform, and the total area of the optical waveguide 22 can be reduced sharply to about ¼ of that of the optical waveguide as shown in FIG. 1.

Although the magnet 28 has a shape of square in the example of FIG. 5, which is simplest and easy to fabricate, this is not essential. Any shape such as a lozenge is acceptable as long as the direction of the magnetic field is perpendicular to the insertion plate, and the face of magnet covers the slit sections.

Figure 6:
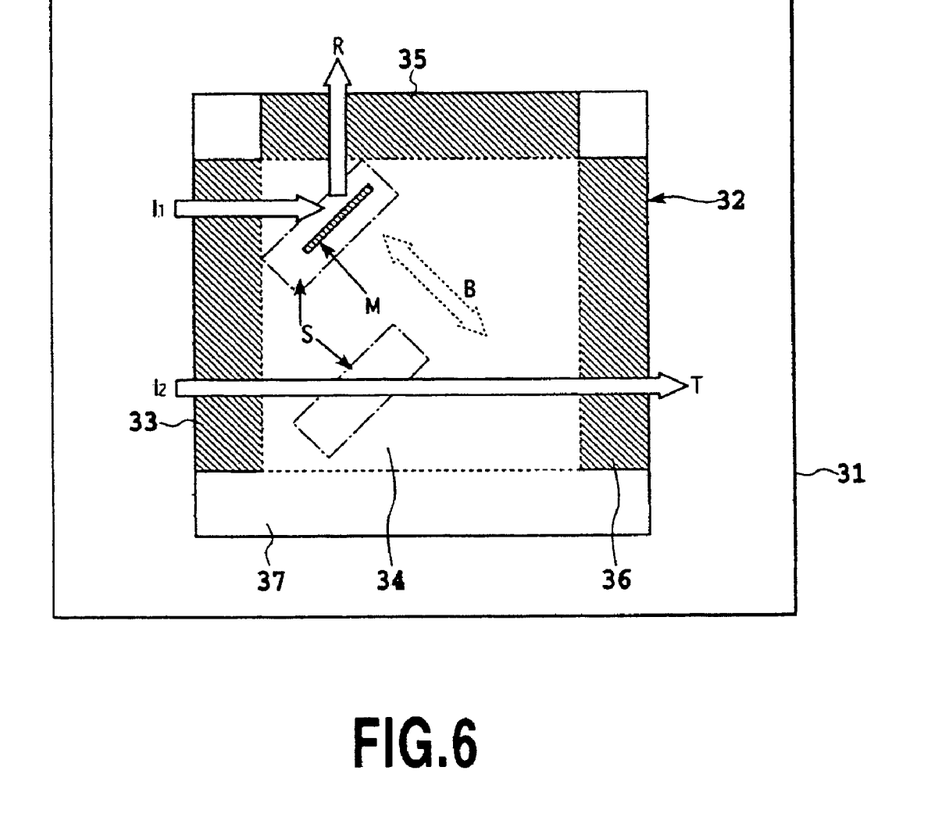
FIG. 6 is a plan view illustrating a configuration of an optical waveguide, an optical device in accordance with the present invention.

FIG. 6 is a plan view showing a configuration of an optical waveguide embedded in an optical device in accordance with the present invention. An optical waveguide 32 is formed on a supporting substrate 31 of the square optical waveguide consisting of five waveguide regions which are assigned different functions.

The region 1 (33) is an area including optical signal input side connecting end faces with a given number of optical fibers. The region 4 (36) is an area including optical fiber connecting end faces corresponding to an output side of optical signals which are input from the region 1 (33), pass through slit sections S and proceed straight forward. The region 3 (35) is an area including optical fiber connecting end faces corresponding to an output side of the optical signals which are input from the region 1 (33), and are reflected off the slit sections S. The region 5 (37) is an area without any optical fiber connecting end faces for outputting the optical waveguides.

The rectangular region 2 (34) surrounded by these regions has the slit sections S. The slit sections S each have an insertion plate M inserted into or removed from the slit section by driving by a magnetic field, thereby controlling the path of the signal light. Accordingly, the magnetic field necessary for driving the insertion plate M must be applied to the region 2 (34).

FIG. 6 illustrates a typical state of the optical waveguides in the input optical waveguide region 1 (33) by way of example of optical beams $I_1$ and $I_2$ which are the input light. As for the optical beam $I_1$, since the insertion plate M is within the slit section S, the input beam $I_1$ is reflected off the insertion plate M, and is output as reflected light R belonging to the fiber connecting region 3 (35) on the reflection output side. As for the optical beam $I_2$, on the other hand, since the insertion plate M is not present in the slit section S, the optical beam $I_2$ passes through the slit sections S and proceeds straight forward, and the transmitted light T is output from the region 4 (36) constituting the output optical fiber connecting region.

When driving the insertion plate M by the magnetic field and current, the highest efficiency is achieved when the direction of the magnetic field B makes a right angle with a plane parallel to a cross section of the slit seen from the top in FIG. 6 (or with a moving locus plane the insertion plate forms in the slit and its neighborhood). Accordingly, the magnet is placed in such a manner that the magnetic field B points the direction of the arrow B indicated by dotted lines in FIG. 6. Incidentally, the insertion plate M is fixed to a cantilever not shown, so that the insertion plate M is driven in conjunction with the cantilever. The drive is carried out by controlling the current flowing through electric wiring formed on the insertion plate M or the cantilever near the insertion plate M.

Figure 7:
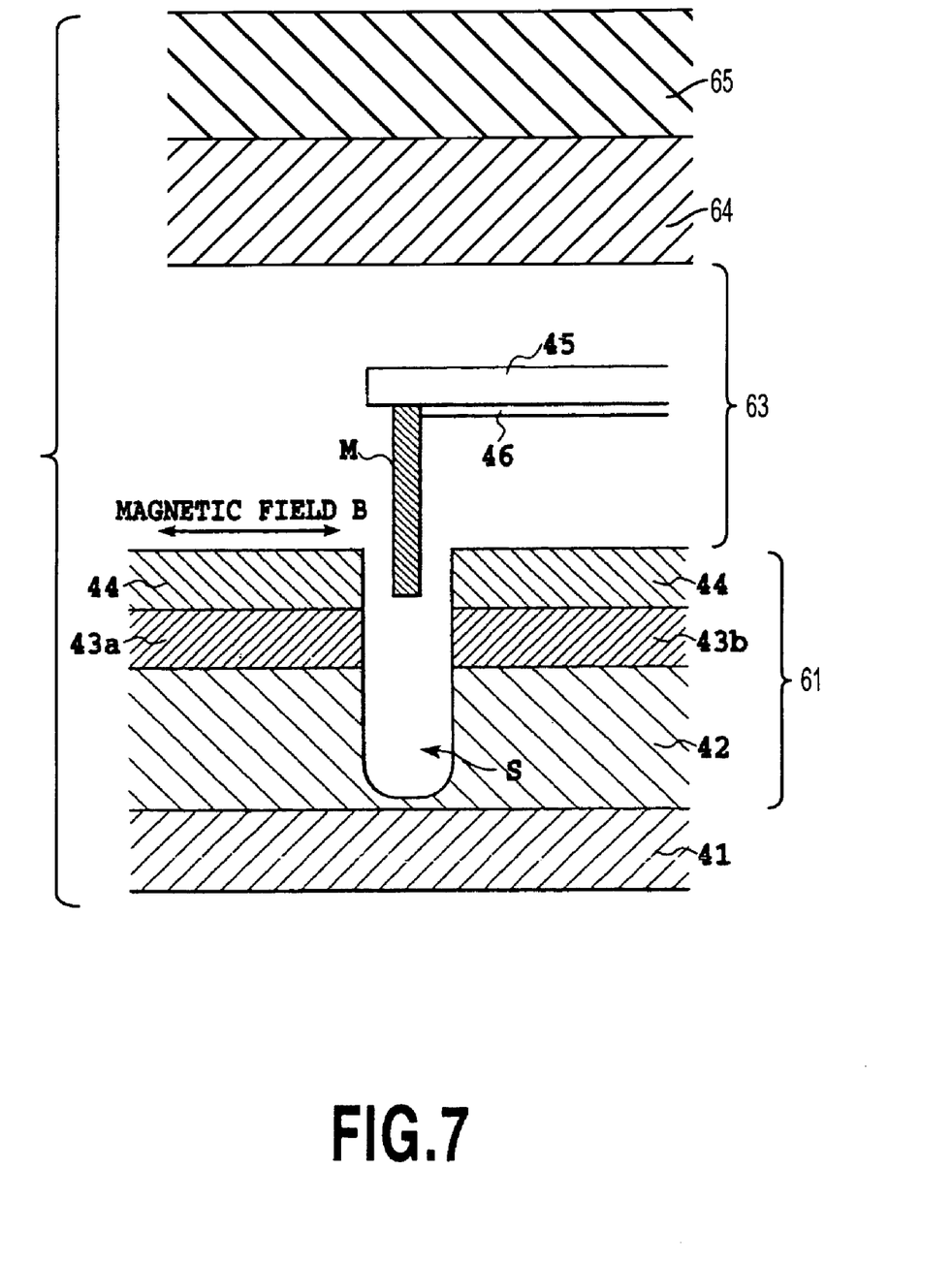
FIG. 7 is a schematic cross-sectional view illustrating relationships between an insertion plate and a slit section provided in an optical waveguide, an optical device in accordance with the present invention.

FIG. 7 is a schematic cross-sectional view illustrating relationships between an insertion plate and a slit section. On a cladding layer 42 stacked on a substrate 41, an input fiber side optical waveguide core 43a and an output fiber side optical waveguide core 43b bare formed. The slit section S is formed in a part of the optical waveguides formed by stacking a cladding layer 44 on these optical waveguide cores. The insertion plate M, which is fixed to a cantilever 45, is driven by a current flowing through electric wiring 46 which is formed at least on the cantilever 45 and has a specified length in the direction normal to the sheet, so that the insertion plate M is inserted into or removed from the slit section S.

The magnetic field applied to the insertion plate M has a component parallel to the sheet so that the magnetic field component acts on part of the electric wiring 46 having the component normal to the sheet. Thus, the current flowing through the electric wiring 46 gives the cantilever 45 the Lorentz force that drives it upward or downward in response to the direction of the current in accordance with Fleming's rule. The direction of the magnetic field that will maximize the Lorentz force acting on the cantilever 45 is the direction perpendicular to the moving direction of the insertion plate M.

Here, the Lorentz force applied to the cantilever is given by the line integral of the vector product of the magnetic field and the current flowing through the wiring on the cantilever. It is important that the wiring does not form a closed loop. For example, as illustrated in FIGS. 8A and 8B which will be described later, it is necessary that three sides of a rectangle are placed on the moving section of the cantilever, that the right side which is open in FIGS. 8A and 8B has a fixed section on the cantilever, that the wiring is drawn out of the fixed section, and that there is no or nearly negligible magnetic field in the outside.

Figure 8A:
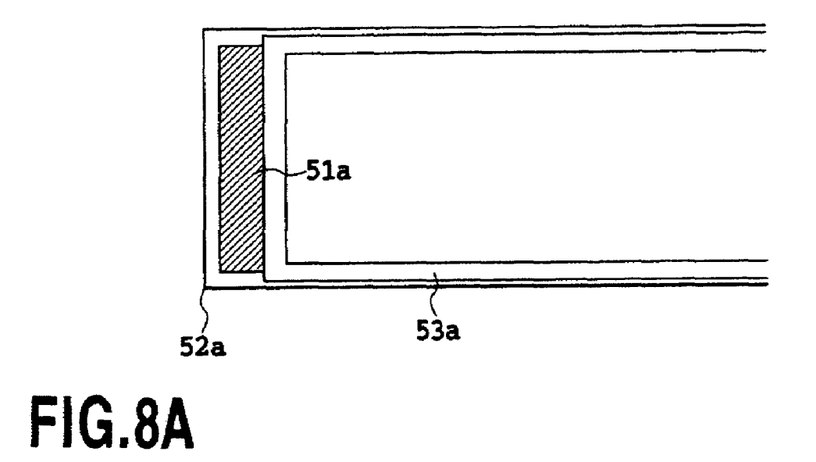
FIGS. 8A and 8B are plan views each showing the insertion plate and the cantilever shown in FIG. 7, which are seen from a bottom side.
Figure 8B:
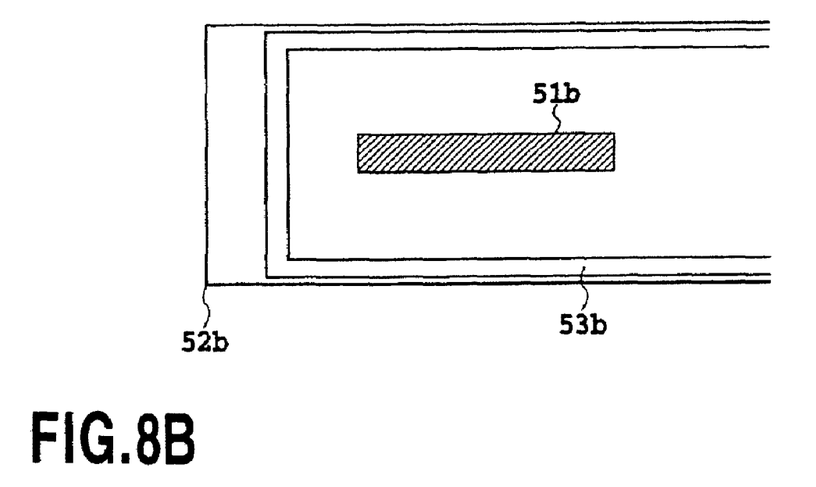

FIGS. 8A and 8B are plan views showing the insertion plate and cantilever of FIG. 7 seen from the bottom side. FIG. 8A is a plan view showing an example in which an insertion plate 51a is attached perpendicularly to a extension direction of a cantilever 52a. In this case, the Lorentz force obtained as the line integral becomes maximum when the direction of the magnetic field is on the sheet, and is parallel to a longitudinal direction of the cantilever. FIG. 8B is a plan view when an insertion plate 51b is attached in parallel with the longitudinal direction of a cantilever 52b.

The insertion plates 51a and 51b are fixed to the front end portions of the free end side of the cantilevers 52a and 52b which constitute such a bimetal, and the free end sides are in a warped state in advance. The amount of the warp of the cantilever is increased or decreased by the effect of the Lorentz force caused by the current flowing through an electric wiring 53a and 53b on the cantilevers 52a and 52b. As a result, the insertion plate moves.

An optical waveguide 61 (42, 43a, 43b, 48) is formed on a supporting substrate 41 of the optical waveguide. On the optical waveguide 61, a MEMS supporting substrate 64 and a magnet 65 are mounted. A MEMS supporting substrate 64 has a MEMS holding region 63 for accommodating an insertion plate driving mechanism (MEMS).

A magnet 65 has such size and shape that a projected image of the magnet onto the optical waveguide 61 from a vertical direction goes into the face of the optical waveguide 61. As a material of the magnet 65, although a Nd—Fe—B based magnet is preferable, it is not limited to it.

Incidentally, the alignment of the optical waveguide 61 with the input side and output side fibers with the fiber cladding layers in the vertical direction is carried out by aligning the center of the fiber cores of the input side fiber and output side fiber of an optical signal to the end faces of the optical waveguide 61 at high accuracy, followed by fixing them mechanically, thereby forming the optical device.

INDUSTRIAL APPLICABILITY

As described above, the optical device (optical switch) in accordance with the present invention is configured such that the insertion plate is held by the flat cantilever having the electric wiring, and the flat magnet is placed in such a manner that the magnet faces the surface of the cantilever opposite to the other surface of the cantilever facing the optical waveguide, and that the current flowing through the electric wiring is controlled in this state so that the Lorentz force caused by the interaction between the current and the magnetic field displaces the cantilever to drive the insertion plate, and to insert or remove the insertion plate into or out of the slit provided in the optical waveguides to switch the optical path of the signal light or to adjust the quantity of the optical beam light. In addition, the magnet is provided with the size and shape that enable the projected image onto the optical waveguides from the vertical direction to go in the face of the optical waveguides. Alternatively, the magnet is placed in such a manner that the extended directions of the linear portions of the edges obtained by projecting the magnet onto the optical waveguide from the vertical direction do not intersect at right angles with the direction of the magnetic field generated by the magnet.

Such configurations can provide the optical device (optical switch) suitable for downsizing and high-density integration, in which the screen plate for interrupting or transmitting light is moved in the direction perpendicular to the substrate by the Lorentz force.

What is claimed is:

1. An optical device having at least one slit at a desired location of a polygonal planar optical waveguide formed on a substrate, and carrying out optical path switching of signal light or control of quantity of light of an optical beam by moving an insertion plate up and down in the slit, said optical device comprising:
   flat insertion plate holding means for holding said insertion plate;
   an electric wiring formed on said insertion plate holding means; and
   a flat magnet placed in a manner that said magnet faces a surface of said insertion plate holding means opposite to a surface facing said optical waveguide, said magnet being placed so that a magnetic field is applied to at least one part of said electric wiring, wherein
   Lorentz force caused by interaction between current flowing through said electric wiring and magnetic field generated by said magnet formed seperately from said insertion plate displaces said insertion plate holding means to drive said insertion plate.

2. The optical device as claimed in claim 1, wherein said magnet has a size and shape that enable a projected image of said magnet onto said optical waveguide from a vertical direction to go in a face of said optical waveguide.

3. The optical device as claimed in claim 1, wherein said magnet is placed in a manner that extended directions of linear portions of edges obtained by projecting said magnet onto said optical waveguide from a vertical direction do not intersect at right angles with a direction of a magnetic field generated by said magnet.

\* \* \* \* \*